United States Patent [19]
Walsh et al.

[11] Patent Number: 5,622,438
[45] Date of Patent: Apr. 22, 1997

[54] FIRE RESISTANT BEARING COMPARTMENT COVER

[75] Inventors: Martin J. Walsh, Farmington; Karl J. Yaeger, Coventry, both of Conn.

[73] Assignee: United Technologies Corporation, Hartford, Conn.

[21] Appl. No.: 501,406

[22] Filed: Jul. 12, 1995

[51] Int. Cl.⁶ .................. F16C 33/72; F01D 25/24; F16J 15/16
[52] U.S. Cl. .................. 384/624; 277/96.1; 415/177
[58] Field of Search .................. 384/130, 483, 384/477, 624; 415/177; 277/96.1

[56] References Cited

U.S. PATENT DOCUMENTS

| | | | |
|---|---|---|---|
| 2,620,157 | 12/1952 | Morley et al. | 253/39.15 |
| 2,930,662 | 3/1960 | Henstridge . | |
| 2,999,670 | 9/1961 | Payne et al. | 253/78 |
| 3,250,512 | 5/1966 | Petrie | 253/39 |
| 3,508,629 | 4/1970 | Haworth | 384/624 X |
| 4,406,459 | 9/1983 | Davis et al. | 277/25 |
| 4,406,460 | 9/1983 | Slayton | 277/25 |
| 4,542,623 | 9/1985 | Hovan et al. | 60/266.1 |
| 4,561,246 | 12/1985 | Hovan | 60/226.1 |
| 4,687,346 | 8/1987 | Suciu | 384/99 |
| 4,709,545 | 12/1987 | Stevens et al. | 60/39.08 |
| 5,226,788 | 7/1993 | Fledderjohn | 415/177 |
| 5,399,066 | 3/1995 | Ritchie et al. | 415/177 X |
| 5,464,227 | 11/1995 | Olson | 277/96.1 |

*Primary Examiner*—Thomas R. Hannon
*Attorney, Agent, or Firm*—Kenneth C. Baran

[57] ABSTRACT

A fire resistant bearing compartment cover (86) for a gas turbine engine features a fluid tight outer wall (106) comprised of an axially extending, radially converging support shell (90) and an axially extending piston ring carrier (92) joined to the support shell by a circumferentially continuous fluid tight joint (104). A heatshield (110) joined to the inner end of the support shell by another circumferentially continuous fluid tight joint (118) and slidably engaging the outer end of the support shell at an expansion joint (128) defines a stagnant air cavity (112). The arrangement reduces the likelihood that any oil leaking out of the bearing compartment will accumulate and be ignited by turbine cooling air (45) which leaks into the cavity.

6 Claims, 4 Drawing Sheets

FIRE RESISTANT BEARING COMPARTMENT COVER

TECHNICAL FIELD

This invention relates to a bearing compartment for a gas turbine engine and particularly to a fire resistant, durability enhancing cover for such a bearing compartment.

BACKGROUND OF THE INVENTION

The rotating shafts of gas turbine engines are supported from a nonrotating support structure by two or more arrays of ball bearings or roller bearings. In many engines, one of the bearing arrays is enclosed within a bearing compartment located radially inward of the engine combustion chamber, the compartment being bounded in part by an outer wall circumscribing the engine shaft. A quantity of compressed air from the engine compressor is ducted past the bearing compartment and into the engine turbines where the air is used to cool the turbines. Although this air is cool relative to the turbines, it is at an elevated temperature compared to the bearing compartment. The presence of this hot air and the proximity of the bearing compartment to the combustor create a harsh, high temperature operating environment for the bearing compartment. A sealing arrangement including a self adjusting face seal and a piston ring seal are used to separate the interior of the bearing compartment from the surrounding local environment.

A lubricant such as oil is supplied to the compartment to lubricate and cool the bearing array and to lubricate the face seal. The face seal minimizes the leakage of oil out of the compartment, and the piston ring seal minimizes the leakage of hot air into the compartment. Minimization of hot air ingress is important because the hot air can ignite and support combustion of oil in the compartment, resulting in an engine fire. Oil leakage out of the compartment can have similar consequences, especially if a quantity of oil accumulates outside the compartment. Moreover, the presence of hot air inside of or immediately adjacent to the compartment encourages the formation of coke within the compartment. Coke is a residue which forms when oil or other hydrocarbons are exposed to high temperatures. Coke contaminates the self adjusting mechanism of the face seal thereby interfering with its smooth operation and compromising the effectiveness of the face seal. In extreme cases, accumulations of coke can cause the mechanism to bind, damaging the mechanism or adjacent parts.

In many engines which have been designed since the late 1960's, the above described sealing arrangement is augmented by a buffering system. In a buffered system, cool buffer air is introduced into a buffer air passage adjacent to the bearing compartment wall. The buffer air flows through the passage and is continuously replenished. The buffer air discharges from the inner end of the passage into an annular buffer cavity where it serves as an additional barrier against the leakage of the turbine cooling air into the bearing compartment. More complete descriptions of buffering systems are found in U.S. Pat. No. 4,542,623 issued to Hovan et al., U. S. Pat. No. 4,561,246 issued to Hovan and U.S. Pat. No. 4,709,545 issued to Stevens et al.

Engines designed prior to the late 1960's (or derived from such earlier designs) run at somewhat lower temperatures than the more modern engines and therefore buffering is not used to protect the bearing compartment. Instead, an insulation blanket is positioned radially outward of the bearing compartment and held in place by a heatshield. It has been determined that the construction of the heatshield and the bearing compartment wall and the presence of the insulating blanket leads to an accumulation of oil in the blanket and exposes the accumulated oil to a continuously flowing stream of hot air. This presents a fire risk since the hot air can ignite and support combustion of the oil. The fire risk develops slowly over time, and therefore the risk is mitigated by carrying out periodic inspections of the hardware and monitoring the temperature of the lubricating oil. Unfortunately, such monitoring and inspection is time consuming and costly, particularly for a bearing compartment which is radially inward of the combustor and therefore not readily accessible without significant disassembly of the engine.

Clearly, it is desirable to eliminate the risk of fire, and to do so in a way that does not involve costly and time consuming inspections. Due to the limited accessibility of the bearing compartment, it is also desirable to minimize the likelihood of damage to components located within or near the bearing compartment.

What is needed is a bearing compartment cover that eliminates the risk of fire and enhances the durability of the bearing compartment components.

DISCLOSURE OF THE INVENTION

It is therefore an object of the present invention to reduce the risk of a bearing compartment fire without incurring the burden of periodic inspections and monitoring.

It is a further object of the invention to provide a bearing compartment cover which is durable and which enhances the durability of components located within the bearing compartment to minimize the need to replace worn or damaged parts.

According to the present invention, a protective cover for a bearing compartment includes a fluid tight outer wall and a heatshield joined to the radially inner extremity of the outer wall by a fluid tight joint and joined to the radially outer extremity of the outer wall by an expansion joint to accommodate differential thermal expansion between the outer wall and the heatshield.

In one embodiment of the invention the heatshield wraps around the radially inner extremity of the outer wall to form an annulus which reduces the temperature within the bearing compartment and therefore reduces the likelihood of coke formation on a piston ring seal inside the compartment.

The primary advantage of the invention is a reduction in the risk of a bearing compartment fire.

A second advantage is the durability of the cover and the reduced likelihood of damage to bearing compartment components due to coke contamination of the piston ring seal.

These and other advantages and features of the invention will become more apparent in view of the following discussion of the best mode for carrying out the invention and the accompanying drawings.

BEST MODE FOR CARRYING OUT THE INVENTION

This invention is predicated in part on the recognition that the accumulation of oil in an insulating cavity of a bearing compartment can, in the presence of a continuously flowing stream of high temperature air, present a threat of fire, and that the fire threat can be significantly reduced with a unique bearing compartment cover that precludes both oil accumulation and the continuous flow of air through the insulating cavity.

Figure 1:
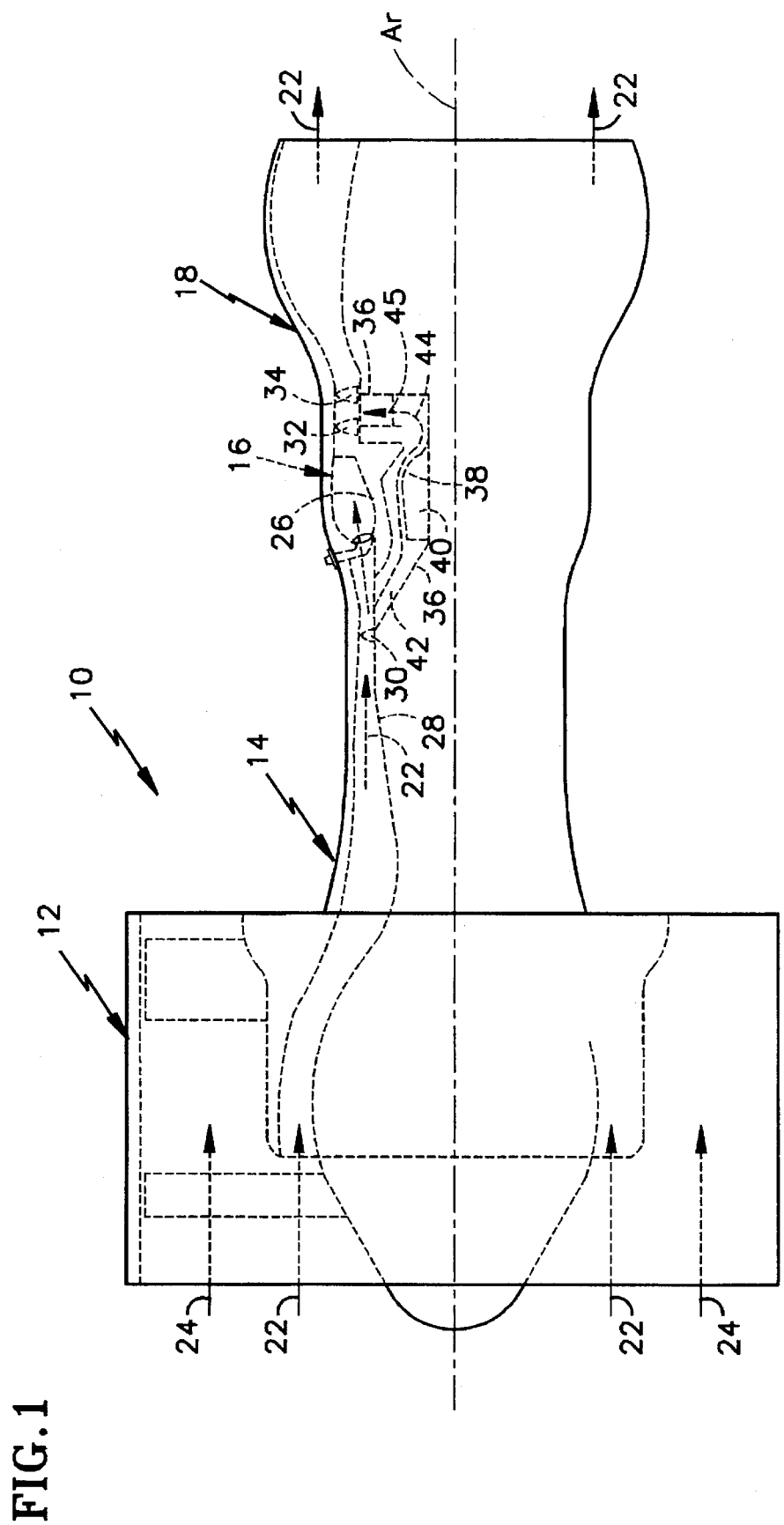
FIG. 1 is a schematic side elevation of a gas turbine aircraft engine, partially sectioned to expose the combustion chamber and the bearing compartment radially inward of the combustion chamber.

FIG. 1 is a side elevation view of a turbofan gas turbine engine 10 for powering an aircraft. The engine has an axis of rotation Ar. The engine includes a fan section 12, a compressor section 14, a combustion section 16 and a turbine section 18. An annular flow path 22 for primary working medium gases extends axially through these sections of the engine. An annular flow path 24 for secondary working medium gases is radially outwardly of the primary flow path working medium gases. The secondary flow path extends axially through the fan section of the engine.

As shown by the dotted lines, a stator assembly 26 extends axially through the engine to bound the working medium flow paths and to support rotating components such as the rotor assembly 28. The rotor assembly bounds the working medium flow path 22 and extends axially through the compression section and the turbine section of the engine. The rotor assembly has rotor stages having rotor blades which extend radially outwardly across the working medium flow path, as represented by the rearmost rotor blade 30 in the compressor and by the first and second stage rotor blades 32, 34 in the turbine.

A rotor shaft 36 extends axially to connect the rotor stages in the compressor to the rotor stages in the turbine. A bearing (not shown) extends between the stator assembly and the rotor shaft to support the shaft. A bearing compartment wall 38 circumscribes the rotor shaft radially inward of the combustor to house the bearing in a bearing compartment 40. An annular cavity 42 radially outward of the rotor shaft adapts the engine to receive the bearing compartment. A flow path 44 for cooling air 45 for the turbine blades extends axially through the annular cavity 42.

Figure 2:
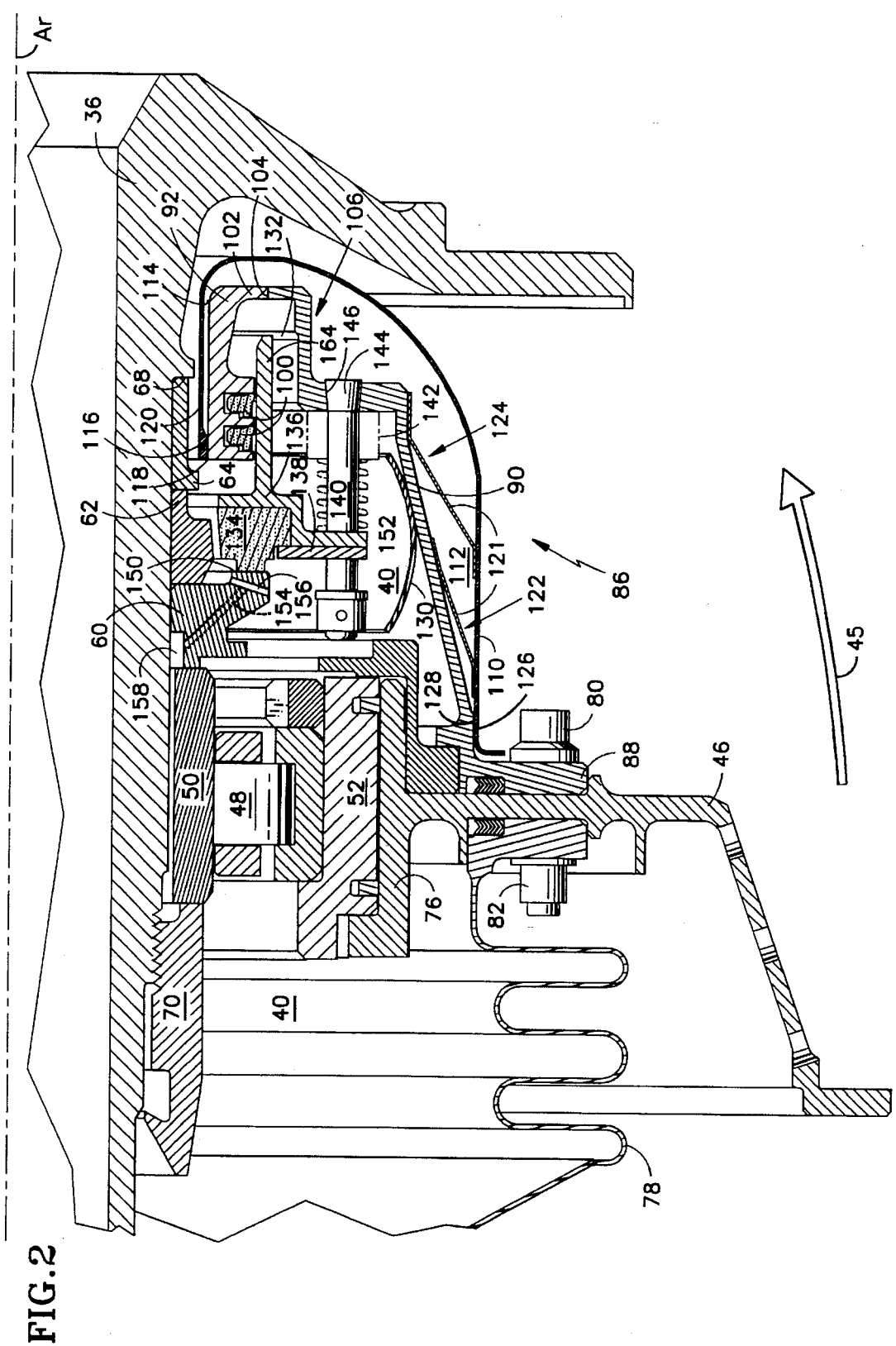
FIG. 2 is a cross sectional side elevation of a bearing compartment for a gas turbine aircraft engine having a fire resistant bearing compartment cover according to the present invention.
Figure 3:
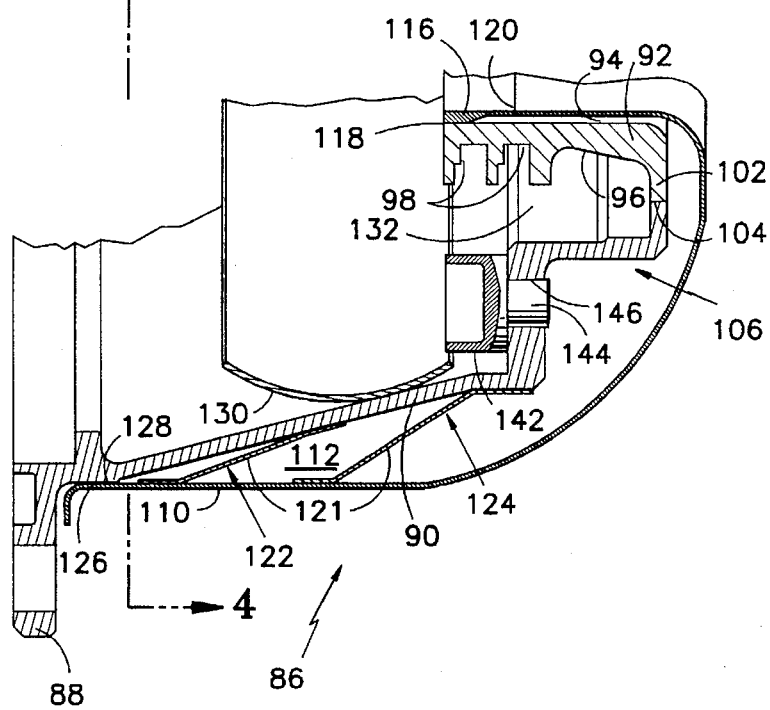
FIG. 3 is a cross sectional side elevation of the fire resistant bearing compartment cover of FIG. 2.
Figure 4:
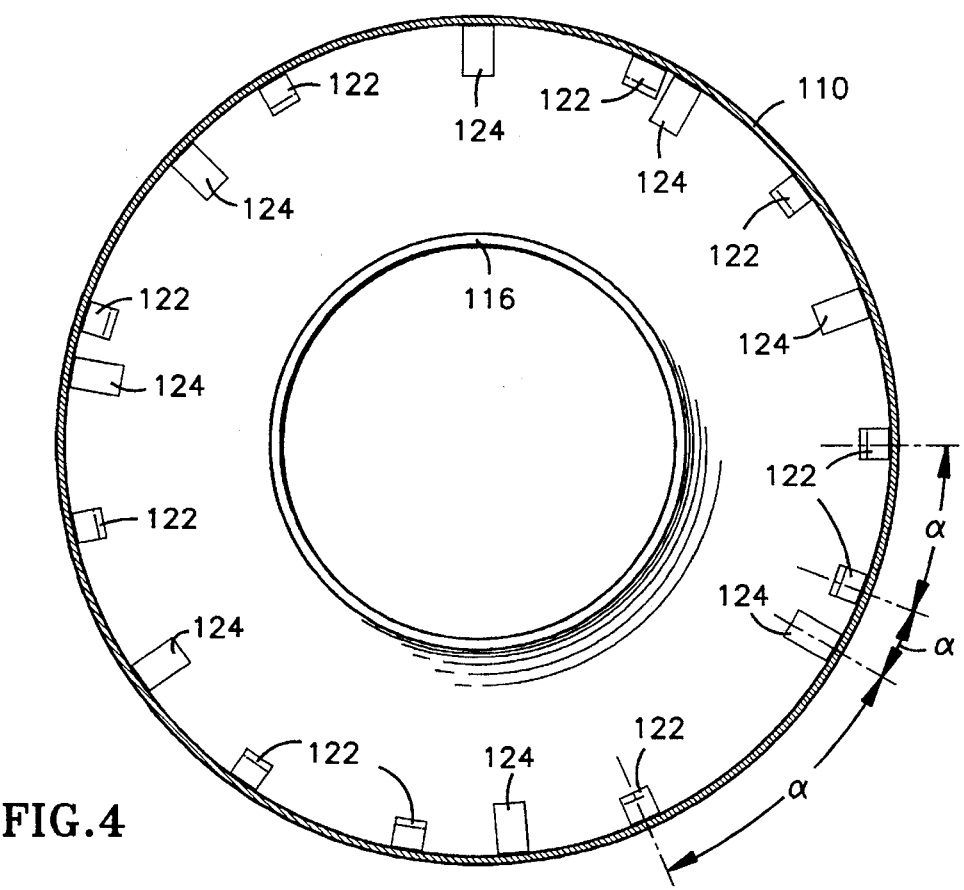
FIG. 4 is a front elevation taken along the line 4—4 of FIG. 3 showing only the heatshield and dampers of the present invention.

Referring to FIGS. 2, 3 and 4, the rotor shaft 36 is supported from a nonrotating annular support 46 by an array of roller bearings as represented by roller 48 disposed radially intermediate an inner race 50 and an outer race 52. The inner race, along with a seal plate 60, a spacer 62 and a sleeve 64 are clamped against a shoulder 68 on the shaft by a retaining nut 70 threaded onto the shaft. The inner race, seal plate, spacer and sleeve rotate with the shaft. The annular support 46 includes a support cylinder 76 at its radially inner end for supporting the bearing outer race. A forward cover 78 is bolted by circumferentially spaced bolts 80 and nuts 82 to the annular support. The forward cover extends axially forward and, at its forwardmost extremity (not shown), is attached to another nonrotating support (also not shown) to enclose the forward portion of the annular compartment 40.

An aft cover 86 encloses the aft portion of the annular bearing compartment. The aft cover has a radially extending flange 88 for bolting the cover to the annular support 46. The aft cover includes an axially extending, radially converging support shell 90. A seal carrier such as piston ring carrier 92 which extends axially forward toward the diverging end of the support shell, is positioned radially inward of the support shell. The piston ring carrier has an inner face 94 and an outer face 96, the outer face having one or more grooves 98 for carrying piston rings 100. A radially extending lip 102 on the piston ring carrier is joined to the support shell by a circumferentially continuous and therefore fluid tight interface such as weld joint 104. Alternatively, the piston ring carrier and support shell can be manufactured as a one piece article. Taken together, the piston ring carrier and support shell comprise a circumferentially continuous fluid tight bearing compartment outer wall 106.

The cover also includes a thin heatshield 110 which is joined to the inner face of the piston ring carrier by a circumferentially continuous and therefore fluid tight joint. The heatshield cooperates with the support shell and piston ring carrier to define a cavity 112 immediately adjacent to the bearing compartment. The heatshield wraps around the inner face of the piston ring carrier and is joined to the inner face near its forward end to form an annulus 114 between the inner face and the heatshield. The cavity, including the annulus 114, thermally shields the bearing compartment from the surrounding local environment. For manufacturing convenience, the heatshield is made in two pieces, one of which is a ring 116. The ring is joined to the inner face by a fluid tight joint such as the circumferentially continuous weld joint 118. The remainder of the heatshield abuts the ring and is joined thereto by another circumferentially continuous fluid tight joint such as weld joint 120.

The support shell and the heatshield may be made of materials having different coefficients of thermal expansion. Accordingly, the heatshield is joined to the outer end of the support shell by an expansion joint. In the preferred embodiment the expansion joint is a slip joint 128 formed by slidable engagement between the heatshield and cylindrical surface 126 near the outer end of the support shell. The slip joint allows relative movement so that differences in the thermal responses of the outer wall and the heatshield do not impose damaging stresses on either part. Although the slip joint extends around the entire circumference of the support shell and heatshield, the slip joint is not fluid tight due to the sliding nature of the joint and imperfect contact between the support shell and the heatshield. As a result, turbine cooling air 45 can enter insulating air cavity 112 between the heatshield and the support shell. However the fluid tight character of joints 104, 118 and 120 ensures that air entering the cavity stagnates rather than flows continuously through the cavity.

At least one row of circumferentially spaced apart vibration dampers 121 resists vibratory excitation and resultant cracking of the heatshield. The outer ends of the dampers are welded to the heatshield. The dampers are deflected within their elastic limit so that their inner ends press against but are not attached to the support shell 90. Vibrator energy is dissipated by friction between the inner ends of the dampers and the support shell. The preferred embodiment has two rows of dampers—a forward row 122 and an aft row 124 circumferentially offset from the forward row. The number of dampers in the forward row is unequal to the number of dampers in the aft row and the ratio of the larger number of dampers to the smaller number of dampers is nonintegral. In the preferred embodiment the forward row has 10 dampers and the aft row has 8 dampers. Each damper extends circumferentially approximately 6.5 degrees (1.25 centimeters at a radius of 11.4 centimeters).

The dampers in each row are spaced nonuniformly around the circumference of the heatshield. The angular spacing α from the center of a damper to the center of a circumferentially neighboring damper is in the range of approximately 8 degrees to 36 degrees (1.6 to 7.1 centimeters at a radius of 11.4 centimeters). In the preferred embodiment, the angular spacings are chosen nondeterministically rather than according to any formula or algorithm. The nonuniform angular spacing of the dampers and the nonintegral ratio of the number of dampers in each row prevent the establishment of periodic vibratory disturbances around the circumference of the heatshield.

Oil is circulated through the bearing compartment by a supply and recovery system which is not part of the invention and therefore is not shown. The oil lubricates the bearings and other surfaces and serves as a heat transfer medium for discharging waste heat from the bearing compartment.

An oil deflector 130 is welded to the interior surface of the support shell. The oil deflector extends approximately 270 degrees around the circumference. The oil deflector directs a portion of oil in the compartment into annular subcavity 132 to cool the subcavity and the components contained therein.

Within the interior of the bearing compartment 40, a carbon seal element 134 is supported by a carbon seal carrier 136. The carbon seal carrier has an axially extending seal land 164 which cooperates with the piston rings 100 to form a piston ring seal for minimizing the ingress of air into the bearing compartment. Retaining ring 138 is riveted to the carbon seal carrier and clamps the seal element securely onto the carrier. The carrier, in turn, is supported from the support shell 90 by a series of circumferentially spaced pins 140. A flared base 144 on one end of each pin fits into holes 146 in the support shell to preserve the fluid tight character of the bearing compartment wall 106. The other end of each pin extends through holes in the carbon seal carrier and retaining ring to position the carrier radially within the compartment and prevent the carrier from rotating. A series of circumferentially spaced coil springs 152 (shown in phantom) urge the carbon seal carrier axially to maintain light but positive contact between the seal element and seal plate, thereby defining a self adjusting face seal 150. The springs 152 and pins 140 are shown at a common circumferential location for illustrative convenience. In practice, the springs and pins are circumferentially alternating, and each spring is retained by a cup-like retainer 142 (also shown in phantom) having a flared base. The flared base of the spring retainer, like the flared base of pins 140, fits snugly into holes 146 to preserve the fluid tight character of the support shell. As the seal surfaces wear or are separated by thermal response differences of the bearing compartment components, the springs keep the seal element in contact with the seal plate to maintain the effectiveness of the seal.

A series of circumferentially spaced oil supply passages 154 and oil return passages 156 extend through the seal plate. The supply passages are circumferentially offset from the return passages. The supply passages deliver oil from supply annulus 158 to the contacting surfaces of the face seal. Inevitably some of this oil, as well as the bearing lubricating oil, leaks past the face seal and into the annular region between the seal element 134 and the spacer 62. A portion of this leakage is returned to the bearing compartment through the return passages.

Figure 5:
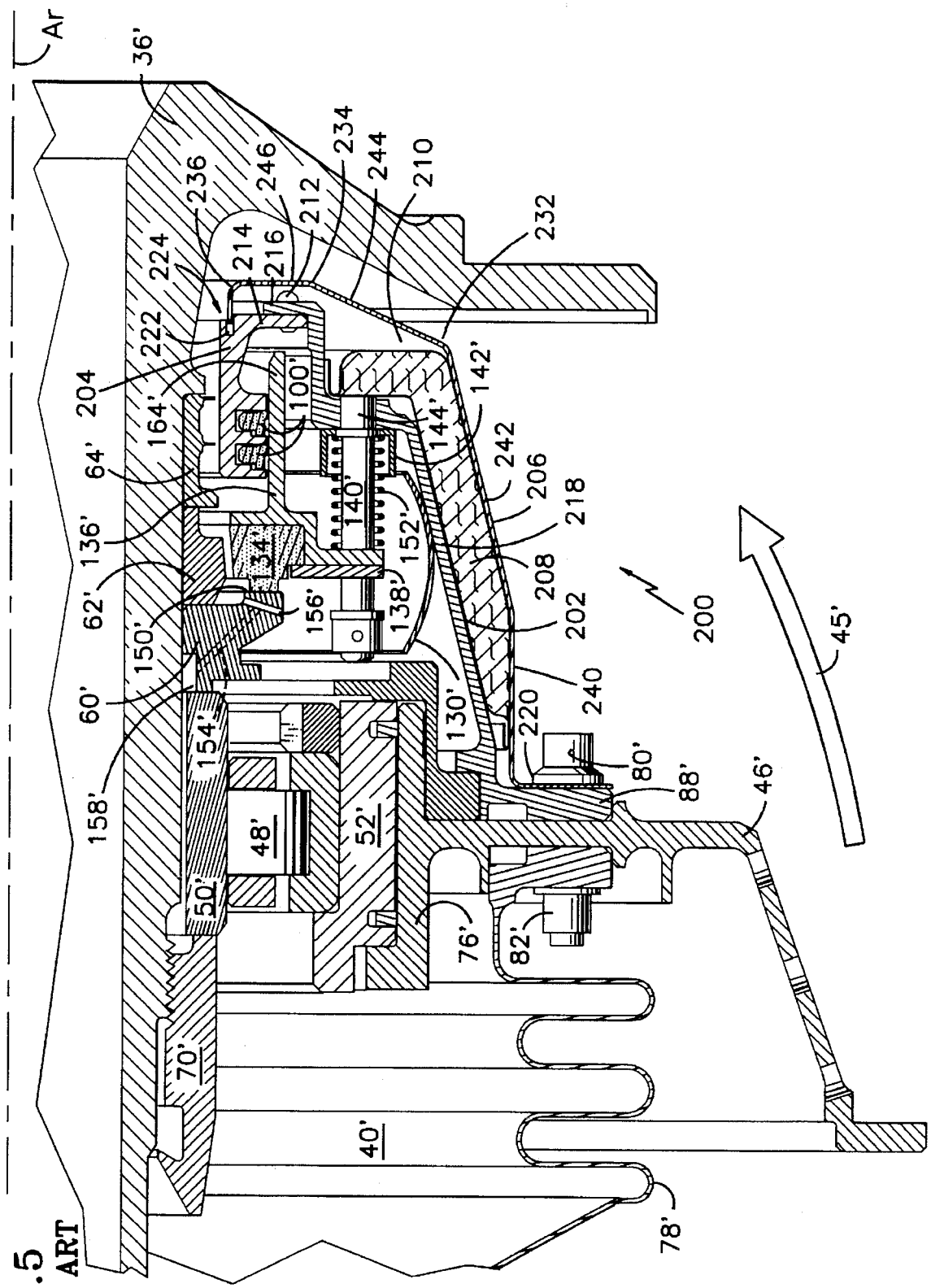
FIG. 5 is a cross sectional side elevation of a bearing compartment for a gas turbine aircraft engine showing a prior art bearing compartment cover.

The manner in which the above described bearing compartment cover resists fire and enhances durability is best appreciated by first considering the prior art bearing compartment cover illustrated in FIG. 5. Features in FIG. 5 which are common to features of FIG. 2 are identified with primed reference numerals. A prior art bearing compartment cover assembly 200 has a support shell 202, a piston ring carrier 204, a heatshield 206 and a porous insulation blanket 208 disposed in cavity 210 between the support shell and the heatshield. The insulation blanket provides thermal protection for the bearing compartment and, because it is sandwiched between the heatshield and the support shell, damps vibrations of the heatshield. A series of circumferentially spaced rivets 212 joins lip 214 of the piston ring carrier to an inwardly extending flange 216 on the support shell to form an aft outer wall 218 of bearing compartment 40'. The rivets form a secure but fluid permeable joint. A bolted connection 220 secures the outer ends of the heatshield and support shell to annular support 46' and positions the heatshield with respect to the support shell. The inner end of the heatshield extends axially into a groove 222 in the piston ring carrier to form a tongue and groove joint 224 which accommodates thermal response differences between the heatshield and the wall 218. Neither the bolted connection 220 nor the tongue and groove joint 224 are fluid tight. Consequently turbine cooling air 45', having a temperature of up to 540 degrees centigrade, seeps past the bolted connection, flows continuously through cavity 210, and is discharged through the tongue and groove joint. Because of its porosity, the insulation blanket 208 resists but does not block the flow of air through the cavity.

During operation of an engine having the prior art bearing compartment cover, oil from within the compartment leaks past the riveted joint and enters the cavity 210. A portion of the oil which leaks past the face seal 150' flows axially between the sleeve 64' and the piston ring carrier 204 and also enters the cavity by way of the non-fluid tight tongue and groove joint. The oil leakage typically occurs with the engine operating at idle power or while the engine operates transiently below idle during startup or shutdown. Once inside the cavity, the oil is absorbed by the insulating blanket rather than leaking out again at a later time. After numerous engine starts, a substantial quantity of oil will have accumulated in the blanket. During subsequent operation of the engine at high power, when the turbine cooling air is at a high temperature, the continuous supply of hot air flowing through the cavity ignites the oil and provides a limitless supply of oxygen for supporting combustion. The resulting fire can burn through the wall 218 and be fueled by the bearing lubrication oil being supplied to the compartment. The fire causes severe engine damage and may necessitate an in-flight shutdown of the engine.

The prior art cover also promotes coke formation within the bearing compartment. Because the prior art cover does not wrap around the inner face of the piston ring carrier 204, the carrier, piston rings 100' and seal land 164' are exposed to temperatures high enough to cause coke formation. The coke impedes the smooth translation of the carbon seal carrier in both the forward and aft directions. Impeded forward translation compromises the effectiveness of the face seal 150'. During some phases of engine operation the seal carrier must translate aftward to accommodate thermal expansion. If coke accumulation causes the carrier to bind up and resist aftward translation, the forces associated with thermal expansion can cause considerable damage. As mentioned previously, the difficulty in accessing the bearing compartment magnifies the undesirability of such damage.

Referring again to FIG. 2 and 3, the fire resistant and durability enhancing properties of the bearing cover according to the invention can now be appreciated. The fluid tight character of the support shell and the fluid tight joints 118, 120 prevent oil which leaks past face seal 150 from entering cavity 112. The fluid tight nature of joint 104 also prevents oil leakage from the bearing compartment into the cavity. Any oil which does enter the cavity, for example through a defective joint, has an opportunity to escape due to the absence of an insulating blanket or any other medium which might absorb and accumulate oil.

The positioning of the expansion joint 128 at the outer juncture of the heatshield and the wall 106, and the positioning of the fluid tight joint at their inner juncture is also significant for preventing oil entry into the cavity. The relative positioning of these joints could be reversed without affecting the accommodation of thermal response differences. However the presence of a fluid permeable slip joint at the inner juncture would establish a path for oil, which leaks past face seal 150, to seep into the cavity 112. It is unlikely that any leakage oil will migrate to the vicinity of the outer juncture, and therefore positioning the slip joint near the outer juncture poses little risk of oil entry into the cavity. Moreover, the positioning of the slip joint at the outer juncture provides an escape path for any oil which manages to enter the cavity, for example through a defective joint.

Although the slip joint 128 admits air into the cavity, the fluid tight character of joints 104, 118 and 120 prevent a continuous flow of air, further reducing the likelihood that any oil in the cavity will be ignited. It has been observed that the stagnant air cavity 112 associated with the present invention operates at temperatures at least 30 degrees centigrade cooler than the continuously flowing cavity 210 of the prior art. The lower temperature not only reduces the fire risk (in the unlikely event that oil has entered in the cavity) but also inhibits coke formation in the bearing compartment.

As described above, coke formation in the piston ring subcavity 132 is of particular concern. Because the heatshield wraps around the piston ring carrier and is attached to the forward end of the carrier rather than to its aft end, the insulating air cavity includes annulus 114. The annulus assures effective insulation of the piston ring subcavity and therefore impedes coke formation therein.

Finally, the smooth contour of the heatshield ensures its durability. The invention, unlike the prior art of FIG. 5, does not have an insulation blanket between the heatshield and the support shell. Since the blanket damps vibrations of the prior an heatshield, the absence of a blanket in the present invention may increase the heatshield's susceptibility to vibration induced cracking. Making the contour smooth, rather than with the abrupt contour changes 230, 232, 234, 236 (FIG. 5) of the prior art, counteracts any such increased susceptibility by eliminating stress concentrations associated with abrupt profile changes. In addition, the continuously curving profile of the heatshield causes it to be stiffer, and therefore more vibration resistant than the prior art heatshield which is comprised of multiple segments 240, 242, 244, 246 each having a linear profile.

We claim:

1. A fire resistant bearing cover for enclosing at least a portion of a bearing compartment in a gas turbine engine, including an axially extending support shell having a radially diverging outer end and a radially converging inner end, a seal carrier positioned radially inward of the support shell, the seal carrier having an inner face and an outer face, the bearing cover characterized by:

a fluid tight interface joining the support shell and the seal carrier so that the support shell and seal carrier define a fluid tight outer wall; and a heatshield joined to the seal carrier by a fluid tight joint, the heatshield also being joined to the outer end of the support shell by an expansion joint to accommodate differential thermal response between the outer wall and the heatshield, the outer wall and the heatshield defining a stagnant insulating air cavity for thermally shielding the bearing compartment from the surrounding local environment.

2. The bearing cover of claim 1, the seal carrier extending axially forward toward the diverging end of the support shell, and the heatshield being joined to the inner face of the carrier near the forward end thereof so that the insulating air cavity includes an annulus radially inward of the inner face.

3. The bearing cover of claim 1, the heatshield having at least one row of circumferentially nonuniformly spaced vibration dampers attached to the heatshield and pressing against the support shell for damping vibrations of the heatshield.

4. The bearing cover of claim 1, the heatshield having a forward row and an aft row of circumferentially nonuniformly spaced vibration dampers attached to the heatshield and pressing against the support shell for damping vibrations of the heatshield, the dampers in the aft row being circumferentially offset from the dampers in the forward row.

5. The bearing cover of claim 4 wherein the number of dampers in the forward row is unequal to the number of dampers in the aft row and the ratio of the larger number of dampers to the smaller number of dampers is nonintegral.

6. The bearing cover of claim 4 wherein the nonuniform circumferential spacing of the dampers is nondeterministic.

* * * * *